(12) United States Patent
Van Haag et al.

(10) Patent No.: US 6,334,712 B2
(45) Date of Patent: *Jan. 1, 2002

(54) DEFLECTION COMPENSATION ROLL AND PROCESS FOR SUPPORTING A ROLL JACKET ON A CROSSPIECE OF THE DEFLECTION COMPENSATION ROLL

(75) Inventors: Rolf Van Haag, Kerken; Reinhard Wenzel, Krefeld, both of (DE)

(73) Assignee: Voith Sulzer Papiertechnik Patent GmbH, Heidenheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,851

(22) Filed: May 7, 1999

(30) Foreign Application Priority Data

May 16, 1998 (DE) ................................. 198 22 145

(51) Int. Cl.[7] ...................................................... F16C 21/00
(52) U.S. Cl. ................................................................ 384/101
(58) Field of Search ................................. 384/121, 107, 384/124, 117, 114, 101

(56) References Cited

U.S. PATENT DOCUMENTS

| | | |
|---|---|---|
| 4,000,559 A | 1/1977 | Korrenn et al. |
| 4,092,048 A | 5/1978 | Bennett, Jr. et al. |
| 5,146,664 A | 9/1992 | Biondetti |

FOREIGN PATENT DOCUMENTS

| | | |
|---|---|---|
| DE | 3348209 | 12/1989 |
| DE | 3902907 | 8/1990 |
| DE | 4015245 | 9/1991 |
| DE | 4042365 | 11/1992 |
| DE | 4209712 | 9/1993 |
| DE | 9218151 | 12/1993 |
| DE | 9218151.1 | 12/1993 |
| FR | 2287615 | 5/1976 |

*Primary Examiner*—Lenard A. Footland
(74) *Attorney, Agent, or Firm*—Greenblum & Bernstein, P.L.C.

(57) ABSTRACT

Deflection adjustment roll and process for supporting a roll jacket on a crosspiece of the deflection compensation roll. The deflection compensation roll includes a crosspiece, roller bearings composed of radial bearings and at least one hydrostatic bearing arrangement, and a roll jacket, which is rotatably supported on the crosspiece by the roller bearings. The at least one hydrostatic bearing arrangement acts in the axial direction. The process includes positioning radial roller bearings each bearing end of the deflection compensation roll and between the crosspiece and the roll jacket, wherein the radial roller bearings absorb radial forces, and positioning at least one hydrostatic bearing arrangement between the crosspiece and the roll jacket, wherein the at least one hydrostatic bearing arrangement absorbs axial forces.

19 Claims, 4 Drawing Sheets

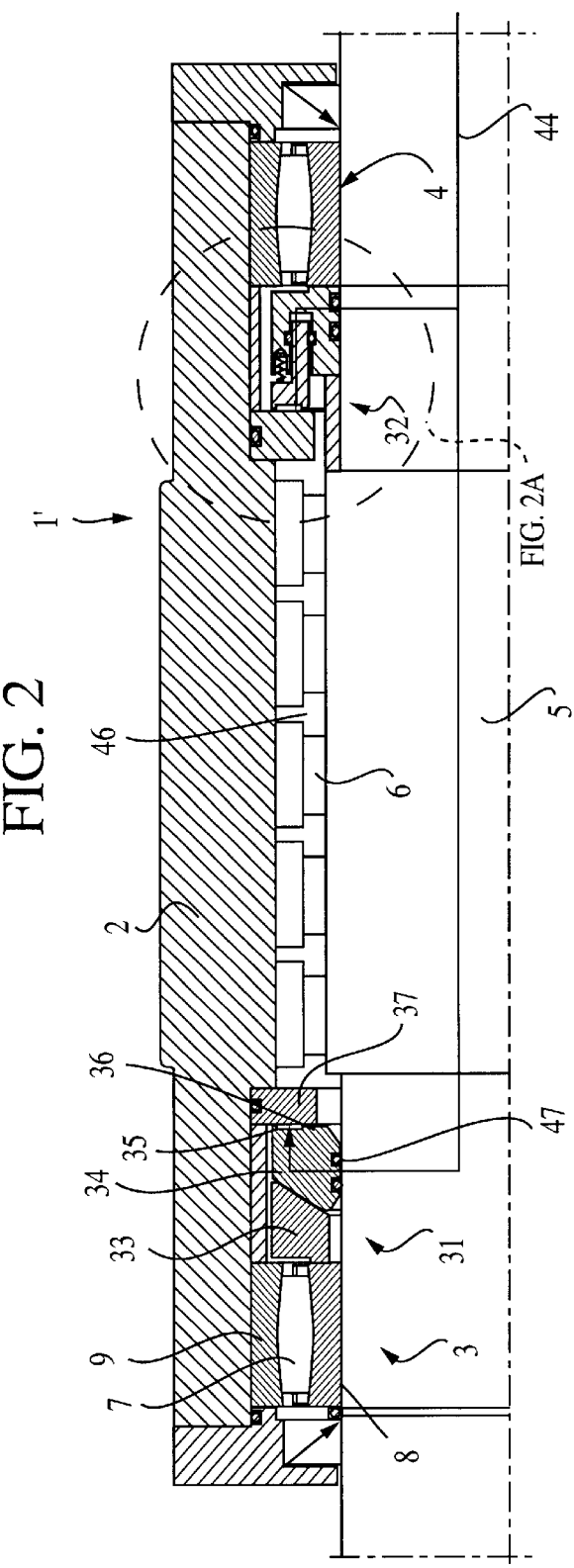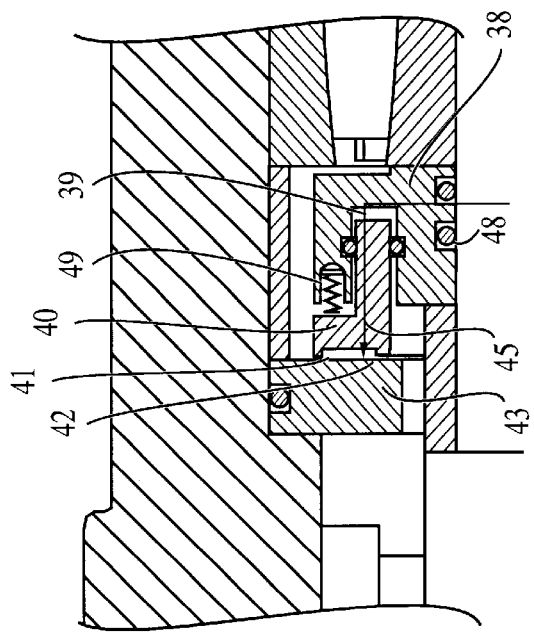

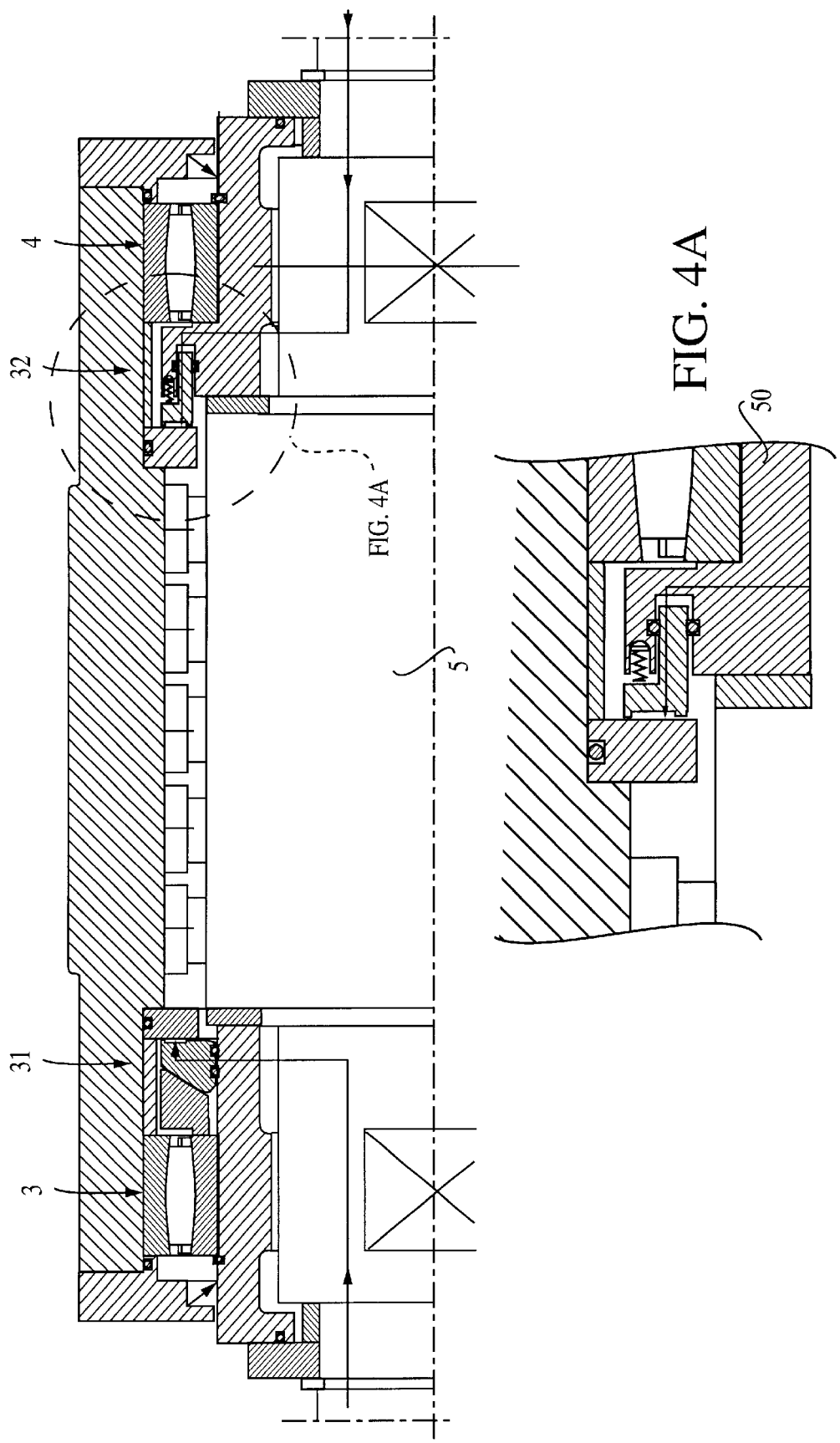

DEFLECTION COMPENSATION ROLL AND PROCESS FOR SUPPORTING A ROLL JACKET ON A CROSSPIECE OF THE DEFLECTION COMPENSATION ROLL

CROSS-REFERENCE TO RELATED APPLICATIONS

The present application claims priority under 35 U.S.C. § 119 of German Patent Application No. 198 22 145.2, filed on May 16, 1998, the disclosure of which is expressly incorporated by reference herein in its entirety.

BACKGROUND OF THE INVENTION

1. Field of the Invention

The present invention relates to a deflection compensation (sag adjusting) roll having a roll jacket that is rotatably supported on a crosspiece by roller bearings and a process for rotatably supporting a roll jacket on a crosspiece in a deflection compensation roll.

2. Discussion of Background Information

Rolls such as those generally discussed above are frequently utilized in calenders for processing a material web. In particular, such rolls are utilized in paper calenders.

Generally, ram-like support elements are disposed between the crosspiece (or carrier) and the roll jacket. When pressure is applied to the support elements, they can counteract deflection or sagging of the roll jacket. Because of this, it is accepted that the crosspiece sags somewhat. In an alternative design, it is also possible to fill one half of the interior of the roll jacket with a hydraulic fluid to which pressure is applied. By reducing the pressure in the region of the rams, it is also possible to obtain a selective pressure or force load on the roll. However, the risk exists that the crosspiece will sag somewhat relative to the roll jacket. In both cases, there is a small but no longer negligible inclination of the crosspiece relative to the roll jacket in the region of the roller bearings.

For this reason, a spherical roller bearing is used on at least one end of the roll jacket. Since the outer ring rotates with the roll jacket, there are high frictional forces due to the variable load on the jacket. This results in certain wear and in reduced service life.

The types of bearings available are limited since it is necessary, in a roller bearing, to equip one end with a fixed bearing and the other end with a movable bearing.

SUMMARY OF THE INVENTION

The present invention relates to a roller bearing for use in a roll and to other type bearings. The present invention is directed to a deflection compensation (sag adjustment) roll of the type generally discussed above that includes roll bearings composed of radial load-carrying bearings (hereinafter "radial bearings") and a hydrostatic bearing arrangement that acts in the axial direction.

Thus, in accordance with the exemplary embodiment of the present invention, the radial bearing is uncoupled from the axial bearing. Thus, it is possible to use known types of bearings for the roller bearings which can absorb only radial forces, i.e., not axial forces. The axial forces are completely absorbed by the hydrostatic bearing arrangement. Under these conditions, it is also possible to use roller bearings having convex, oblong-shaped rolling elements between an inside ring and an outside ring. In this manner, the profile radius is substantially larger than that of barrel-shaped roller bearings or spherical roller bearings. Further, the races on the inside ring and the outside ring have an appropriately large race radius. Such bearings are, e.g., available from the company SKF under the name CARB-roll bearings (see, e.g., SKF company publication: The CARB-Roll Bearing—The Better Solution, e.g., in Drying Cylinders on the Guide End). Such bearings permit relatively large angles of inclination and also relatively large axial displacements between the inner ring and the outer ring. However, these bearings are not capable of acting as fixed bearings. The axial support, as mentioned, is provided by the hydrostatic bearing arrangement. Since the hydrostatic bearing arrangement generates relatively low frictional losses and also operates relatively free of wear, in accordance with the present invention, it is possible to match the service life of the radial bearing and the axial bearing to each other.

Preferably, the bearing arrangement has a first axially oriented support surface, which works along with a piston-cylinder arrangement and a second oppositely oriented support surface, which works along with a support shoe arranged in the axial direction relative to the crosspiece. Thus, the two support surfaces are surrounded in tong-like fashion and retained by the piston-cylinder arrangement and the support shoe. Accordingly, the piston-cylinder arrangement may be used to readjust axial movements of the roll jacket to ensure that both support surfaces and their corresponding opposing elements contact each other. Of course, the axial displacement path of the piston-cylinder arrangement must be designed such that it can, if necessary, keep pace with and balance the corresponding differences in length of the roll jacket. However, these may be estimated or calculated in advance with adequate accuracy.

Moreover, the piston-cylinder arrangement may have a ring piston which surrounds the crosspiece. The ring piston may have the advantage that the compressive forces in the circumferential direction are distributed virtually uniformly everywhere, such that no periodic changes, which could result in vibration or some other phenomenon, can occur during a rotation of the roll jacket.

Advantageously, the piston and the support shoe have bearing pockets which are coupled to the same pressure source. Since the bearing pockets act on opposite sides of the roll jacket or other parts connected therewith, on which the support surfaces are located, it may be ensured that an equilibrium of forces always exists between the roll jacket and the crosspiece. This may also be true when the bearing pockets have the same active surface and are provided with the same throttle resistance in their feeder line. If the throttle resistances differ greatly, due to, e.g., different line lengths, it may also be possible to create an appropriate balance through the effective surface of the bearing pockets.

Advantageously, the support surfaces may be located on the roll jacket and the piston-cylinder arrangement, and the support shoe may be located on the crosspiece. This arrangement may simplify the feeding of the hydraulic fluid which has to be supplied only to a stationary part, i.e., the crosspiece.

Preferably, the bearing arrangement may include a disk which is acted upon on both sides. The disk may be coupled with the roll jacket and may be surrounded in a tong-like fashion by the bearing arrangement. Thus, the roller bearing, which is adjacent to the hydrostatic bearing arrangement, is the fixed bearing. The other bearing is the movable bearing.

In an alternative embodiment of the present invention, the bearing arrangement may have a first annular disk positioned on one roll end and a second annular disk positioned on the other roll end. The first annular disk and the second annular disk may be arranged to work with the piston and support shoe, respectively. In this arrangement, there is a tong-like mounting of the roll jacket, in which the jaws of the tongs are roughly as far apart as the effective working width of the roll jacket.

It may be preferable that the piston and the support shoe act on the annular disks axially from the outside. In this embodiment, the axial interior of the roll jacket may remain free for the built-in parts necessary for deflection or sag compensation, e.g., hydrostatic support shoes. When the hydrostatic axial bearing arrangement is divided into the two parts which are positioned adjacent to the roll bearing, the piston in the piston-cylinder arrangement must travel a somewhat longer path, since it must compensate for greater differences in length of the roll jacket. Thus, the radial bearing on which the support shoe is positioned is utilized as the fixed bearing, and the radial bearing on which the piston-cylinder arrangement is positioned is utilized as the movable bearing.

It may be preferable that the annular disks form an axial seal with the support shoe or the piston-cylinder arrangement. Such an axial seal may be necessary when the interior of the roll jacket is to be placed under hydraulic pressure. A seal between the annular disks and the roll jacket can be achieved in a relatively problem free manner. The same is true for a seal between either the support shoe or the piston-cylinder arrangement and the crosspiece. Since the hydrostatic pressure of the bearing pockets is present on the contact surfaces, the seal between the moving surfaces, i.e., between one annular disk and the support shoe and between the piston-cylinder arrangement and the other support disk, can be managed relatively well since. While this arrangement may result in certain leakage of the hydraulic fluid radially outwardly, no pressure escapes from the interior of the roll jacket.

Advantageously, the support shoe and/or the piston-cylinder arrangement may be tiltable relative to the crosspiece. Thus, it may be ensured that despite a certain deflection or sagging of the crosspiece, it is always possible to obtain plane-parallel contact of the support shoe or piston-cylinder arrangement with the annular disks or disk. Such a tiltable mounting may be achieved, e.g., in that the support shoe is supported in an axially oriented spherical cap, or permits the piston to assume somewhat of an angle relative to the cylinder.

The present invention is directed to a deflection adjustment roll that includes a crosspiece, roller bearings composed of radial bearings and at least one hydrostatic bearing arrangement, and a roll jacket, which is rotatably supported on the crosspiece by the roller bearings. The at least one hydrostatic bearing arrangement acts in the axial direction.

In accordance with another feature of the present invention, the hydrostatic bearing arrangement may include a piston-cylinder arrangement, a support shoe, which is fixed in the axial direction relative to the crosspiece, a first axially oriented support surface being adapted for coupling to the piston-cylinder arrangement, and a second axially oriented support surface oppositely oriented with respect to the first axially oriented support surface being adapted for coupling with the support shoe. Moreover, the piston-cylinder arrangement may include a ring piston arranged to surround the crosspiece. Further, a pressure source may be provided, and the piston and the support shoe may have bearing pockets connected to the pressures source. Further still, the first and second support surfaces are coupled to the roll jacket. The piston-cylinder arrangement and the support shoe may be coupled to the crosspiece. Still further, at least one of the support shoe and the piston-cylinder arrangement are tiltably mounted relative to the crosspiece.

According to still another feature of the present invention, the hydrostatic bearing arrangement may include a disk. The disk may be composed of two axial sides adapted to exerted upon with a pressure.

According to a further feature of the present invention, a piston and a support shoe may be provided. The roll jacket includes a first and a second bearing end, the hydrostatic bearing arrangement includes a first annular disk positioned at the first bearing end and a second annular disk positioned at the second bearing end, the piston is positioned to act on the first annular disk, and the support shoe is positioned to act on the second annular disk.

In accordance with a still further feature of the present invention, the piston and support shoe are positioned to act on axially outer surfaces of the first and second annular disks, respectively. Further, the first and second annular disks may be positioned to form an axial seal with a respective one of the piston and the support shoe.

According to yet another feature of the present invention, the at least one hydrostatic bearing arrangement includes a plurality of hydrostatic bearing arrangements. The plurality of hydrostatic bearing arrangements may be positioned axially inside of the radial roll bearings. Still further, the at least one hydrostatic bearing arrangement includes a plurality of hydrostatic bearing arrangements, one of the plurality of hydrostatic bearing arrangements includes a first and second bearing element, and the first and second bearing elements are slidably coupled along a plane oblique to axial direction. Further still, the at least one hydrostatic bearing arrangement includes a plurality of hydrostatic bearing arrangements, and the plurality of hydrostatic bearing arrangements are coupled to the crosspiece. Further, a bearing ring is postionable over the crosspiece, the at least one hydrostatic bearing arrangement includes a plurality of hydrostatic bearing arrangements, and the plurality of hydrostatic bearing arrangements are coupled to the bearing ring.

According to another feature of the present invention, the at least one hydrostatic bearing arrangement is positioned axially between the radial roller bearings. According to still another feature of the present invention, the at least one hydrostatic bearing arrangement is coupled to the crosspiece. In accordance with still another feature of the present invention, a bearing ring may be postionable over the crosspiece, and the at least one hydrostatic bearing arrangement may be coupled to the bearing ring.

According to yet another feature of the present invention, the present invention is directed to a process for treating a web in an apparatus that includes the deflection compensation roll. The process includes forming a nip between the deflection compensation roll and a counter roll, and guiding the web through the nip. Further, the process may include loading the deflection compensation roll by pressing the roll jacket in a direction away from the crosspiece. Moreover, the process may include absorbing axial forces on the roll jacket with the at least one hydrostatic bearing arrangement.

The present invention is directed to a process for rotatably supporting a roll jacket on a crosspiece that extends through the roll jacket in a deflection compensation roll. The process includes positioning radial roller bearings at each bearing end of the deflection compensation roll and between the crosspiece and the roll jacket, wherein the radial roll bearings absorb radial forces, and positioning at least one hydrostatic bearing arrangement between the crosspiece and the roll jacket, wherein the at least one hydrostatic bearing arrangement absorbs axial forces.

In accordance with another feature of the present invention, the at least one hydrostatic bearing arrangement includes a piston-cylinder arrangement, a support shoe that is fixed in the axial direction relative to the crosspiece, a first axially oriented support surface, and a second axially oriented support surface oppositely oriented with respect to the first axially oriented support surface. The process further includes biasing the piston of the piston-cylinder arrangement toward the first axially oriented support surface, and positioning the support shoe opposite the second axially oriented support surface. Moreover, the process further includes coupling the first and second support surfaces to the roll jacket, and coupling the piston-cylinder arrangement and the support shoe to the crosspiece.

According to still another feature of the present invention, the deflection compensation roll may include a piston, a support shoe, the hydrostatic bearing arrangement including a first annular disk positioned at a first bearing end of the deflection compensation roll and a second annular disk positioned at a second bearing end of the deflection compensation roll. The process may further include positioning the piston to act on the first annular disk, and positioning the support shoe to act on the second annular disk. Further, the process may include positioning the piston and support shoe to act on axially outer surfaces of the first and second annular disks, respectively. Still further, the process may include positioning the first and second annular disks to form an axial seal with a respective one of the piston and the support shoe.

According to a still further feature of the present invention, the at least one hydrostatic bearing arrangement may include a plurality of hydrostatic bearing arrangements, and the process may further include positioning the plurality of hydrostatic bearing arrangements axially inside of the radial roller bearings.

In accordance with another feature of the present invention, the at least one hydrostatic bearing arrangement may include a plurality of hydrostatic bearing arrangements, the process may further include coupling the plurality of hydrostatic bearing arrangements to the crosspiece.

In accordance with still another feature of the present invention, the deflection compensation roll includes a bearing ring postionable over the crosspiece and the at least one hydrostatic bearing arrangement comprising a plurality of hydrostatic bearing arrangements, and the process may further include coupling the plurality of hydrostatic bearing arrangements to the bearing ring.

According to a further feature of the present invention, the process may further include positioning the at least one hydrostatic bearing arrangement axially between the radial roll bearings. According to still another feature of the present invention, the process may further include coupling the at least one hydrostatic bearing arrangement to the crosspiece.

In accordance with yet another feature of the present invention, the deflection compensation roll may include a bearing ring postionable over the crosspiece, and the process may further include coupling the at least one hydrostatic bearing arrangement to the bearing ring.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 2 and 2A illustrate an enlarged detail of a second embodiment of the deflection compensation roll, and an enlarged detail of a hydrostatic bearing arrangement;

FIGS. 4 and 4A illustrate an enlarged detail of a fourth embodiment of the deflection compensation roll having jacket lift, and an enlarged detail of a hydrostatic bearing arrangement.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
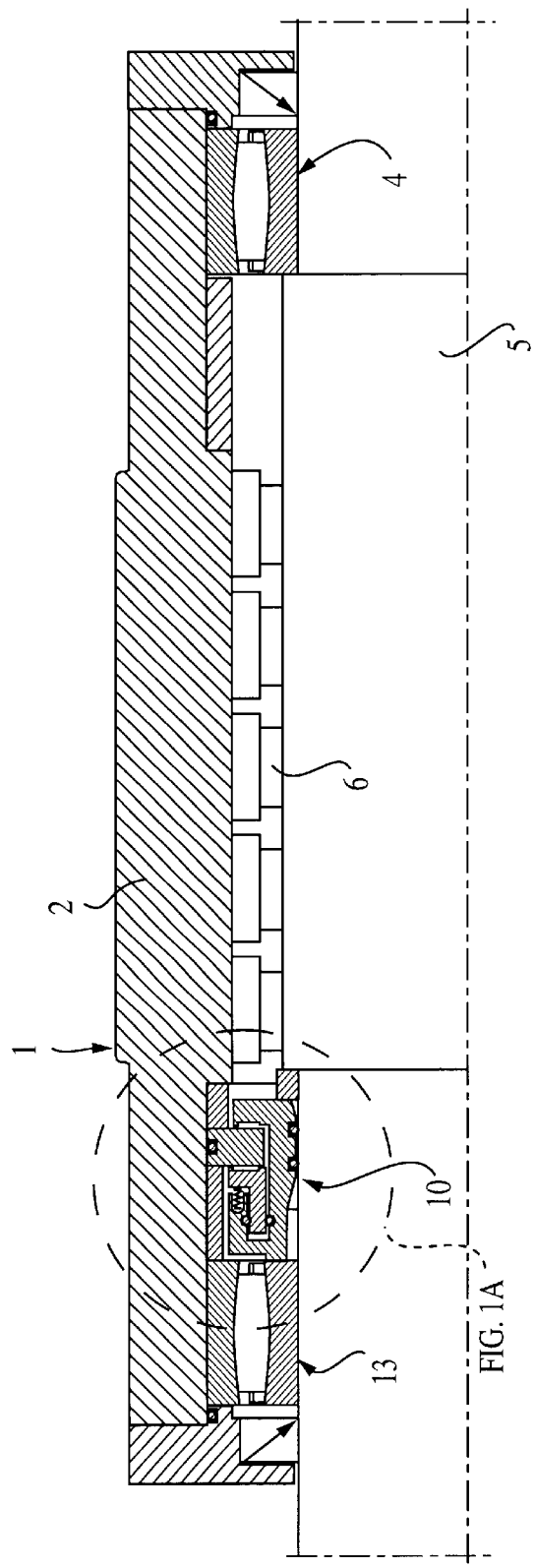
FIGS. 1 and 1A illustrate a first embodiment of a deflection compensation roll, and an enlarged detail of a hydrostatic bearing arrangement.

FIGS. 1 and 2 schematically depict a longitudinal section of one-half of a deflection compensation (sag adjustment) roll 1 having a roll jacket 2, which is rotatably mounted on a reversible crosspiece 5 by roller bearings 3 and 4.

Support elements 6, which may be, e.g., hydrostatic support elements, are positioned between roll jacket 2 and crosspiece 5. When roll jacket 2 is loaded during operation, e.g., during glazing of a paper web, roll jacket 2 tends to sag due to the loading. However, as is known in the art, this sagging or deflection can be counteracted or compensated for using support elements 6. In this manner, a force is introduced into crosspiece 5, which, accordingly, somewhat sags or is deflected.

In practice, roller bearings 3 and 4 can absorb only radial forces, and they include convex, oblong-shaped rolling elements 7 positioned between an inside separator 8 and an outside separator 9. The convex, oblong-shaped rolling elements 7 are relatively long. A race radius of an inside ring and an outside ring is substantially larger than the race radius of conventional spherical roller bearings. Roller bearings 3 and 4 are available, e.g., under the name "CARB" from the company SKF, and, like normal spherical roller bearings, roller bearings 3 and 4 can compensate for misalignment and absorb radial loads. Moreover, roller bearings 3 and 4 can compensate for radial displacements of roll jacket 2 relative to crosspiece 5 like a cylinder roller bearing. Thus, roller bearings 3 and 4 have a relatively high angular mobility and a relatively high axial adjustability. However, in practice, these roller bearings 3 and 4 cannot absorb axial forces.

Figure 1A:
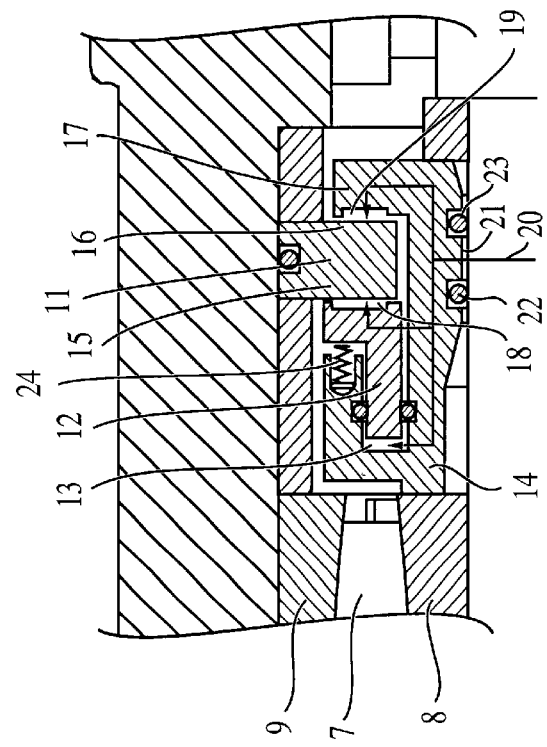

Accordingly, the axial mounting of roll jacket 2 relative to crosspiece 5 is provided by a hydrostatic bearing arrangement 10. As shown in greater detail in FIG. 1A, bearing arrangement 10 includes a disk 11, which is fixedly coupled or connected, in both the axial and rotational directions, with roll jacket 2. A piston-cylinder arrangement, which includes a piston 12 and a cylinder 13, is coupled or attached axially to crosspiece 5. Piston 12 may be, e.g., a ring piston, and it may be sealingly mounted in cylinder 13 and movable in the axial direction. Cylinder 13 may be arranged within a housing 14. Piston 12 may be pre-loaded in a direction toward disk 11 using, e.g., a spring 24 positioned between piston 12 and housing 14 to adjust a gap between disk 11 and piston 12. With a proper design, the spring force sets an optimum gap size. With its end, piston 12 contacts a support surface 15 of disk 11. A radial projection 17 of housing 14 may contact an axially opposing support surface 16 of disk 11. Accordingly, disk 11 may be gripped in tong-like fashion by piston 12 and projection 17 of housing 14.

Bearing pockets 18 and 19, which can be supplied with hydraulic fluid via a line 20, may be arranged in the surfaces of piston 12 and projection 17 to contact support surfaces 15 and 16. Line 20 may also supply hydraulic fluid to cylinder 13. Throttles (not depicted in detail) may be positioned between line 20 and bearing pockets 18 and 19. Thus, bearing arrangement 10 acts as a hydrostatic bearing. The hydraulic fluid introduced through line 20 flows out through a gap between piston 12 and support surface 15 or through a gap between projection 17 and support surface 16. In this manner, an equilibrium is produced such that disk 11 has a distance maintained between its support surfaces 15 and 16 and piston 12 and projection 17, respectively. This distance may be maintained as small as possible due to the pressure prevailing in cylinder 13, but a distance is provided. In this manner, wear is kept low by hydrostatic lubrication.

Housing 14 may be non-rotatably and immovably (fixedly) positioned in the axial direction on crosspiece 5. Housing 14 may also include a convexly arranged bearing surface 21 which is bounded by two O-rings 22, 23, such that a slight tilting movement of housing 14 relative to crosspiece 5 is possible. In this manner, it may be ensured that even with sagging or deflection of crosspiece 5 there will always be plane-parallel contact of the end surface of piston 12 or the end surface of projection 17 on support surfaces 15 and 16 of disk 11.

In the exemplary embodiment, roller bearing 3, which is arranged in the vicinity of bearing arrangement 10, forms a fixed bearing. Accordingly, roller bearing 4 may be the movable bearing. In accordance with this arrangement, axial movement between crosspiece 5 and roll jacket 2 is permitted.

FIG. 2 depicts another embodiment of a roll 1', in which the same elements are provided with the same reference numerals. Roller bearing 3 may be arranged in the region of the fixed bearing, while roller bearing 4 may form the movable bearing.

In this embodiment, the hydrostatic bearing arrangement may include two parts relatively distant from each other, e.g., a support arrangement 31 may be located axially inside and near roller bearing 3 and a piston-cylinder arrangement 32 may be located axially inside and near roller bearing 4. Roller bearings 3 and 4 are formed as discussed in the embodiment shown in FIG. 1.

Support shoe arrangement 31 may include a spherical cap-shaped base 33, which is stationarily or fixedly disposed both axially and rotationally on crosspiece 5. Base 33 supports a support shoe 34, which has an end, e.g., a right end when viewed in the axial direction, that includes a hydrostatic bearing pocket 35. The end of support shoe 34 with hydrostatic bearing pocket 35 may be positioned to contact a support surface 36 of an annular disk 37, which is coupled or connected non-rotatably and stationarily in the axial direction to roll jacket 2.

Piston-cylinder arrangement 32, shown in greater detail in FIG. 2A, may include a housing 38, which is arranged non-rotatably and stationarily in the axial direction on crosspiece 5. A cylinder 39 is provided in housing 38 so that a piston 40, which may be, e.g., a ring piston, can move in the axial direction. Piston 40 has an end, e.g., a left end when viewed in the axial direction, that includes a hydrostatic bearing pocket 41, which is connected fixedly in the axial direction to roll jacket 2. A spring 45 may be positioned between housing 38 and piston 40.

Thus, piston-cylinder arrangement 32 and support shoe arrangement 31 are arranged to grip annular disks 37 and 43 in a tong-like manner. Cylinder 39 may be placed under pressure using hydraulic fluid, which is supplied through a line 44. Piston 40 may have a connection line between pressure pocket 41 and cylinder 39, such that bearing pocket 41 is provided with pressure via the hydraulic fluid. Line 44 may also supply bearing pocket 35 in support shoe 34.

As with the embodiment depicted in FIG. 1, piston 40 must have relatively high axial mobility in cylinder 39 since it must be able to compensate for the entire longitudinal change of roll jacket 2.

Hydrostatic bearing arrangement 31 and 32 may also be utilized in this embodiment to seal interior 46 of roll jacket 2 axially outwardly. In this manner, support shoe 34 may be attached via sealing rings 47, and housing 38 may be attached via sealing ring 48 to crosspiece 5. These sealing rings will not, in most cases, be able to completely prevent hydraulic fluid from leaking out of interior 46. However, they will sufficiently prevent pressure loss in interior 46. Thus, an escape of pressure between contact surfaces 35 and 36 of support shoe 34 and annular disk 37, respectively, or piston 40 and support surface 42 of annular disk 43 is not possible because the pressure in bearing pockets 41 prevents the same.

Because of the spherical cap-shaped bearing surface of the base 33 and the correspondingly adapted bearing surface of support shoe 34, tiltability of support shoe 34 relative to crosspiece 5 is provided on this side of hydrostatic bearing arrangement 31, such that crosspiece 5 can sag somewhat, without sacrificing the plane-parallel alignment of the surfaces with the hydrostatic bearing pocket 35 on support surface 36 of annular disk 37. In the region of piston-cylinder arrangement 32, parallel alignment may be retained in that piston 40 can be positioned at somewhat of an angle within cylinder 39.

In the embodiments of FIGS. 1 and 2, roll jacket 2 is centered relative to crosspiece 5. Such rolls are commonly referred to as "C-type" rolls, and the roller bearings 3 and 4 are attached directly to crosspiece 5.

Figure 3:
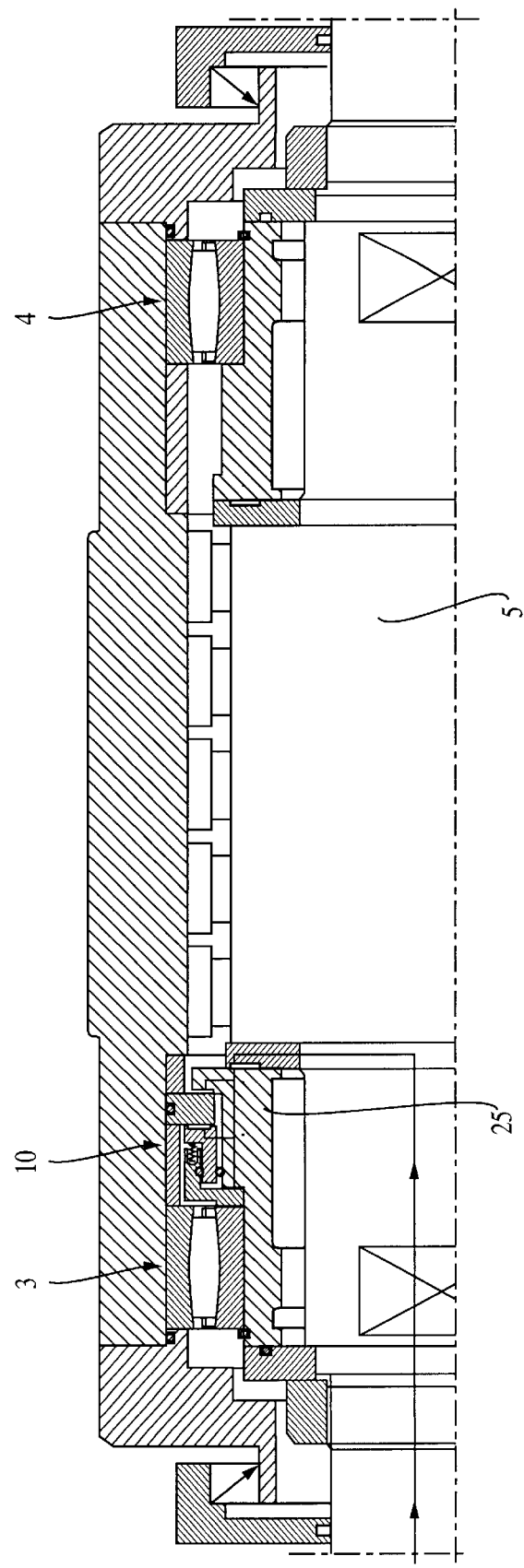
FIG. 3 illustrates a third embodiment of the deflection compensation roll having a jacket lift.

Hydrostatic axial bearings 10, 31, and/or 32 can also be utilized in rolls having jacket lift, i.e., commonly referred to as "F-type" rolls, as schematically depicted in FIGS. 3 and 4. It is noted that the embodiment shown in FIG. 3 corresponds largely to that depicted in FIG. 1, and that the embodiment shown in FIG. 4 corresponds largely to that depicted in FIG. 2.

In the embodiment illustrated in FIG. 3, roller bearings 3 and 4 and hydrostatic bearing arrangement 10 are no longer attached directly to crosspiece 5. Rather, these elements are coupled to a bearing ring 25 that surrounds crosspiece 5. In a known manner, crosspiece 5 may be flattened parallel to the direction of displacement on the axial positions where the bearing ring or carrier 25 is located. Accordingly, bearing ring 25 may include flat guide surfaces such that it can be shifted up and down, based on the depiction in FIG. 3. When bearing ring 25 can be inclined relative to crosspiece 5, which will often be the case, then it is possible to do without the convex shape of housing 14 and to dispose housing 14 directly on bearing ring 25.

Similarly, it is possible to arrange hydrostatic bearing arrangement 32, as well as roller bearings 3 and 4, not only directly on crosspiece 5, as depicted in FIG. 2, but also on a bearing ring or carrier 50, which, as shown in greater detail in FIG. 4A, can be displaced upwardly and downwardly relative to crosspiece 5. With the displacement of bearing ring 25 or 50, roll jacket 2 as a whole may be raised or lowered relative to crosspiece 5, under the action of support elements 6.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A deflection adjustment roll comprising:
   a crosspiece;
   roll bearings composed of radial bearings and at least one hydrostatic bearing arrangement, said hydrostatic bearing arrangement being positioned axially inside of said radial bearings; and
   a roll jacket, which is rotatably supported on the crosspiece by the roll bearings,
   wherein the at least one hydrostatic bearing arrangement acts in the axial direction.

2. The roll according to claim 1, the hydrostatic bearing arrangement comprising:
   a piston-cylinder arrangement;
   a support shoe, which is fixed in the axial direction relative to the crosspiece;
   a first axially oriented Support surface being adapted for coupling to the piston-cylinder arrangement; and
   a second axially oriented support surface oppositely oriented with respect to the first axially oriented support surface being adapted for coupled with the support shoe.

3. The roll according to claim 2, the piston-cylinder arrangement comprising a ring piston arranged to surround the crosspiece.

4. The roll according to claim 2, further comprising a pressure source; and
   the piston and the support shoe having bearing pockets connected to the pressures source.

5. The roll according to claim 2, wherein the first and second support surfaces are coupled to the roll jacket, and
   wherein the piston-cylinder arrangement and the support shoe are coupled to the crosspiece.

6. The roll according to claim 2, at least one of the support shoe and the piston-cylinder arrangement being tiltably mounted relative to the crosspiece.

7. The roll according to claim 1, the hydrostatic bearing arrangement comprising a disk,
   wherein the disk is composed of two axial sides adapted to exerted upon with a pressure.

8. The roll according to claim 1, further comprising:
   a piston;
   a support shoe;
   the roll jacket comprising a first and a second bearing end;
   the hydrostatic bearing arrangement comprising a first annular disk positioned at the first bearing end and a second annular disk positioned at the second bearing end;
   the piston being positioned to act on the first annular disk; and
   the support shoe being positioned to act on the second annular disk.

9. The roll according to claim 8, wherein the piston and support shoe are positioned to act on axially outer surfaces of the first and second annular disks, respectively.

10. The roll according to claim 9, wherein the first and second annular disks are positioned to form an axial seal with a respective one of the piston and the support shoe.

11. The roll according to claim 8, the at least one hydrostatic bearing arrangement comprising a plurality of hydrostatic bearing arrangements,
    wherein the plurality of hydrostatic bearing arrangements are positioned axially inside of the radial roll bearings.

12. The roll according to claim 8, the at least one hydrostatic bearing arrangement comprising a plurality of hydrostatic bearing arrangements,
    one of the plurality of hydrostatic bearing arrangements comprising a first and second bearing element;
    the first and second bearing elements being slidably coupled along a plane oblique to axial direction.

13. The roll according to claim 8, the at least one hydrostatic bearing arrangement comprising a plurality of hydrostatic bearing arrangements,
    the plurality of hydrostatic bearing arrangements being coupled to the crosspiece.

14. The roll according to claim 8, further comprising a bearing ring postionable over the crosspiece;
    the at least one hydrostatic bearing arrangement comprising a plurality of hydrostatic bearing arrangements; and
    the plurality of hydrostatic bearing arrangements being coupled to the bearing ring.

15. The roll according to claim 1, wherein the at least one hydrostatic bearing arrangement is positioned axially between the radial roll bearings.

16. The roll according to claim 1, wherein the at least one hydrostatic bearing arrangement is coupled to the crosspiece.

17. A deflection adjustment roll comprising:

a crosspiece;

roller bearings composed of radial bearings and at least one hydrostatic bearing arrangement, said radial bearings comprising non-spherical, convex rolling elements; and a roll jacket, which is rotatably supported on the crosspiece by the roller bearings, wherein the at least one hydrostatic bearing arrangement acts in the axial direction.

18. The deflection adjustment roll in accordance with claim 17, wherein said hydrostatic bearing arrangement is positioned axially inside of said radial bearings.

19. The deflection adjustment roll in accordance with claim 17, wherein said non-spherical, convex rolls are arranged between an inside ring and an outside ring, each with a race radius greater than that of a spherical bearing.

* * * * *